United States Patent
Sipilä et al.

(10) Patent No.: US 8,433,989 B2
(45) Date of Patent: Apr. 30, 2013

(54) ERROR CHECKING WITH DATA PRESENCE DETECTION

(75) Inventors: Teemu Sipilä, Oulunsalo (FI); Jukka Vikstedt, Oulu (FI)

(73) Assignee: Nokia Corporation, Espoo (FI)

( * ) Notice: Subject to any disclaimer, the term of this patent is extended or adjusted under 35 U.S.C. 154(b) by 237 days.

(21) Appl. No.: 12/933,676

(22) PCT Filed: Mar. 19, 2008

(86) PCT No.: PCT/EP2008/002225
§ 371 (c)(1),
(2), (4) Date: Sep. 20, 2010

(87) PCT Pub. No.: WO2009/115099
PCT Pub. Date: Sep. 24, 2009

(65) Prior Publication Data
US 2011/0029848 A1 Feb. 3, 2011

(51) Int. Cl.
*G06F 11/00* (2006.01)
(52) U.S. Cl.
USPC .................. 714/807; 714/760; 714/774
(58) Field of Classification Search .................. 714/807, 714/760, 774, 779
See application file for complete search history.

(56) References Cited

U.S. PATENT DOCUMENTS

| | | | |
|---|---|---|---|
| 5,991,308 A * | 11/1999 | Fuhrmann et al. | 370/395.53 |
| 7,128,270 B2 * | 10/2006 | Silverbrook et al. | 235/472.01 |
| 7,605,940 B2 * | 10/2009 | Silverbrook et al. | 358/1.17 |
| 7,730,381 B2 * | 6/2010 | Butala et al. | 714/760 |
| 8,107,542 B1 * | 1/2012 | Lou et al. | 375/259 |
| 2004/0001428 A1 | 1/2004 | Datta | |

FOREIGN PATENT DOCUMENTS

| | | |
|---|---|---|
| GB | 2389020 A | 11/2003 |
| WO | 2005/125042 A | 12/2005 |
| WO | 2007/139566 A | 12/2007 |

OTHER PUBLICATIONS

International Search Report and Written Opinion received in corresponding Patent Cooperation Treaty Application No. PCT/EP2008/002225, Dec. 16, 2008, 9 pages.
"3rd Generation Partnership Project; Technical Specification Group Radio Access Network; Multiplexing and channel coding (FDD) (Release 7)", 3GPP TS 25.212 V7.0.0, Mar. 2006, 84 pgs.
"3rd Generation Partnership Project; Technical Specification Group Radio Access Network; Common test environments for User Equipment (UE); Conformance testing (Release 10)", 3GPP TS 34.108 V10.1.0, Mar. 2012, 25 pgs.

* cited by examiner

*Primary Examiner* — Fritz Alphonse
(74) *Attorney, Agent, or Firm* — Harrington & Smith

(57) ABSTRACT

The present invention relates to an apparatus and a method for detecting presence of data, wherein input data is decoded using a decoder metric to obtain decoded data, and an error check is performed for the decoded data. Furthermore, a threshold value is determined based on an obtained maximum value that the decoder metric can assume for the input data, and the threshold value is compared with an actual value of the decoder metric. Presence of the input data is then decided based on results of the error check and the comparison.

20 Claims, 2 Drawing Sheets

ERROR CHECKING WITH DATA PRESENCE DETECTION

RELATED APPLICATION

This application was originally filed as PCT Application No. PCT/EP2008/002225 filed on Mar. 19, 2008, which is incorporated herein by reference in its entirety.

FIELD OF THE INVENTION

The present invention relates to a method and apparatus for checking errors in various communication technologies, such as for example Wideband Code Division Multiple access (WCDMA), and more specifically Wideband adaptive multi-(WB-AMR) rate speech coding.

BACKGROUND OF THE INVENTION

In the downlink direction from $3^{rd}$ generation radio access networks to terminal devices, the length of each transmitted block of data (called transport block) is not fixed but changes basically all the time. The length of a block of data is thus unknown to the receiver. The term "transport format" is used here as a synonym for the transport block length. The transport format contains also other pieces of information than the block length, but the transport format is detected by detecting the block length. The length of a particular transport block can be signaled in a control channel using a transport format combination indicator (TFCI). If the length is not signaled, then the receiver has to detect the block length blindly (so-called called blind transport format detection (BTFD)) and/or to perform a so-called single transport format detection (STFD) depending on rules specified e.g. in the $3^{rd}$ Generation Partnership Project (3GPP) specification TS 25.212 section 4.3. For example, in case of WB-AMR, a terminal device (e.g. user equipment (UE)) has to do STFD for the transport format.

Blind transport format detection can be achieved by using a cyclic redundancy check (CRC). CRC is a type of function that takes as input a data stream of any length and produces as output a value of a certain fixed size. The term CRC is often used to denote either the function or the function's output. CRC can be used as a checksum to detect alteration of data during transmission or storage. It is a common method in all communication systems to detect if a data block has errors or not. CRC result is "OK" if the CRC-code check reveals that the data was correct. CRC result is "NOT OK" if CRC-code check reveals that the data was incorrect. The CRC-check may be done after error correction decoding such as Viterbi- or turbo-decoding.

Viterbi-decoding may be applied to a soft decision sample sequence. The correct trellis path of a Viterbi-decoder ends at the zero state at the correct end bit position. The blind transport format detection method using CRC traces back the surviving trellis path ending at the zero state (hypothetical trellis path) at each possible end bit position to recover the data sequence. For each recovered data sequence error-detection is performed by checking the CRC, and if there is no error, the recovered sequence is declared to be correct.

In general, the term "metric" is used hereinafter to designate a measure of similarity between a received code word or signal and one of allowed or candidate code words or signals defined by the underlying coding procedure.

When there is no data at all in the input to the CRC, the CRC will generally say "NOT OK". However, there will be "false alarms", i.e. the CRC says "OK", even though the input was pure noise. The frequency of these false alarms is determined by the strength of the CRC-code. With weak CRC-codes, such as the 8-bit CRC in $3^{rd}$ Generation Partnership Project (3GPP) WCDMA, there will be false alarms quite often. For example, in the WB-AMR network configuration as specified in 3GPP specification TS 34.108 section 6.10.2.4.1.62, one transport channel with a transport time interval (TTI, time duration of one transport block, e.g. one message) of 20 ms has 8-bit CRC. The purpose of this transport channel is to send signaling information to a terminal device or user equipment (UE) to request the UE to use a certain WB-AMR data rate in the uplink.

However, the transport channel does not always contain data. If there is no data in that channel, the CRC will produce a false alarm once every 256 TTI's which is once every 5 seconds. This may cause a situation where the UE chooses a wrong WB-AMR data rate in the uplink, so that the UE uses an uplink data rate different from that specified by the network.

Hence, CRC may lead to excessive false alarms causing the UE to use a wrong data rate in the uplink. An improved data checking mechanism which leads to less spurious data rate changes would therefore be desirable.

SUMMARY OF THE INVENTION

In some embodiments an apparatus comprises:
a decoder configured to decode input data using a decoder metric to obtain decoded data;
a error detector configured to perform an error check for said decoded data;
a threshold generator configured to determine a threshold value based on an obtained maximum value that said decoder metric can assume for said input data;
a comparator configured to compare said threshold value with an actual value of said decoder metric; and
a data presence detector configured to decide on a presence of said input data based on results of said error check and said comparison.

Furthermore, in some embodiments a method comprises:
decoding input data using a decoder metric to obtain decoded data;
performing an error check for said decoded data;
determining a threshold value based on an obtained maximum value that said decoder metric can assume for said input data;
comparing said threshold value with an actual value of said decoder metric; and
deciding on a presence of said input data based on results of said error check and said comparison.

Accordingly, frequency of false alarms caused by error checking results can be reduced due to the proposed double checking, which leads to much less spurious data rate changes in systems such as in WB-AMR. The proposed solution can be easily implemented for example in DSP application. In an example, modifications can be reduced to only one or two additional if-conditions and one additional comparison per TTI. Other inputs may already be available.

In an exemplary implementation according to an embodiment, the decoder or decoding functionality may be configured to decode the input data by using a Viterbi metric. As a further option, a cyclic redundancy check may be carried out for the decoded data by the error detector or error detection functionality.

The threshold generator may be configured to determine the threshold value as a predetermined portion of the obtained maximum value. The predetermined portion may be set at a corresponding setting input. As an additional option, the threshold generator may be configured to obtain the maximum value by calculating a sum of all elements of an input vector without applying the decoder metric.

Further advantageous modifications are defined in the dependent claims.

BRIEF DESCRIPTION OF THE DRAWINGS

In the following, the present invention will be described on the basis of embodiments with reference to the accompanying drawings in which.

DESCRIPTION OF EMBODIMENTS

Figure 1:
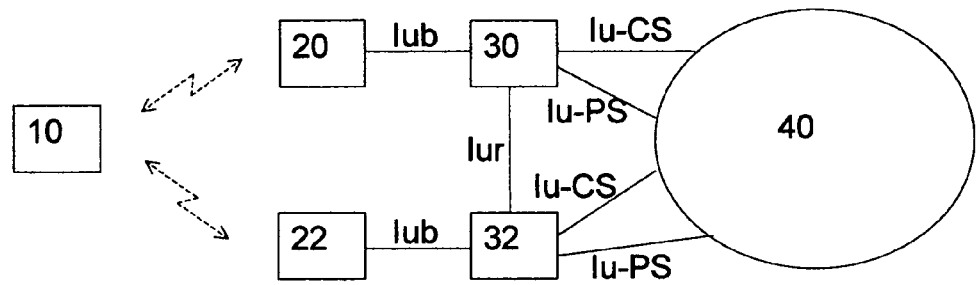
FIG. 1 shows a schematic diagram of network architecture in which the present invention can be implemented.

Embodiments will now be described on the basis of a $3^{rd}$ generation Wideband CDMA (WCDMA) radio access network architecture as shown in FIG. 1.

$3^{rd}$ generation mobile systems like UMTS (Universal Mobile Communications System) are designed to provide a wide range of services and applications to the mobile user. A mobile user gets access to UMTS through the WCDMA-based UTRAN (UMTS Terrestrial Radio Access Network). A base station or Node B 20, 22 terminates the L1 air interface and forwards the uplink traffic from a UE 10 to an RNC 30, 32. The RNCs 30, 32 are responsible for radio resource management (RRM) and control all radio resources within their part of the UTRAN. The RNCs 30, 32 are the key interface partners for the UE 10 and constitute the interface entity towards a core network 40, e.g. via a UMTS Mobile Switching Center or a Serving GPRS (General Packet Radio Services) Support Node (SGSN). Within the UTRAN, Asynchronous Transfer Mode (ATM) is used as the main transport technology for terrestrial interconnection of the UTRAN nodes, i.e. RNCs and Node Bs.

In the simplified sample architecture shown in FIG. 1, the UE 10 is connected via an air interface to a first Node B 20 and/or a second Node B 22. The first and second Node Bs 20, 22 are connected via respective Iub interfaces to first and second RNCs 30, 32 which are connected to each other via a Iur interface. The Node Bs 20, 22 are logical nodes responsible for radio transmission and reception in one or more cells to/from the UE 10 and terminate the Iub interface towards the respective RNC 30, 32. The RNCs 30, 32 provide connections to the core network 40 for circuit switched traffic via a Iu-CS interface and for packet switched traffic via a IuPS interface. It should be noted that in a typical case many Node Bs are connected to the same RNC.

According to some embodiments, detection of data presence is performed by using a double-check procedure, which may be applied in WB-AMR, for example. However, the proposed mechanism can be used in other similar cases as well. The basic idea is to do a double-check after the CRC reveals "OK".

The double-check is based on the metrics of a decoder which may be a Viterbi decoder in the exemplary WB-AMR case. If the CRC leads to the result "OK", then a hypothetical maximum value the decoder metric can assume for the input signal is determined. Then, the actual metric obtained from the decoder is compared to a predetermined portion of the hypothetical maximum value (i.e. a threshold), and if the actual metric is greater than the predetermined portion of the hypothetical maximum value, then it is decided that data was present. Otherwise it is decided that no data was present (which implies that the CRC made a wrong decision).

Figure 2:
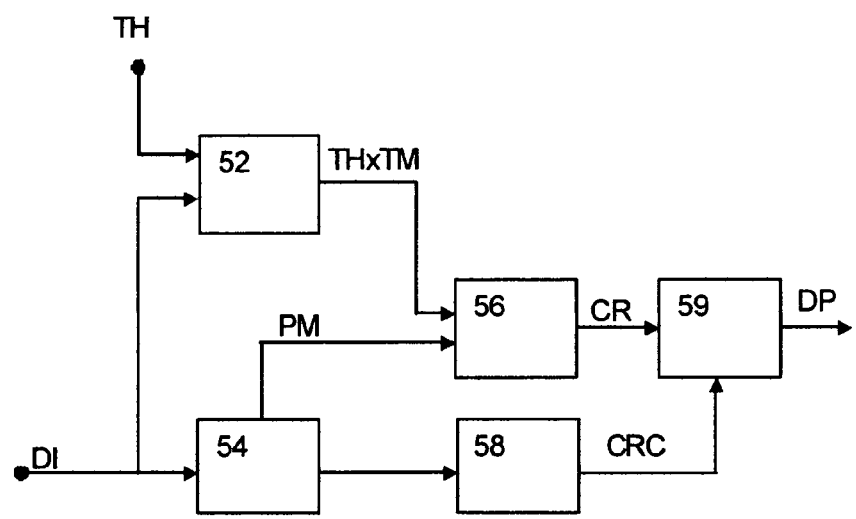
FIG. 2 shows a schematic block diagram of a data presence detector according to a first embodiment.

FIG. 2 shows a schematic block diagram of a data presence detector or detection functionality according to the first embodiment, which may be provided at a terminal device, e.g. the UE 10, or a base station device, e.g. the Node Bs 20, 22, and which may be implemented as a complex circuit arrangement, an integrated circuit, a chip set or a module, based on discrete analog and/or digital hardware circuits, a digital signal processor, or a software-controlled computer device.

Input data DI is applied via a decoder unit or function 54 to a CRC function or unit 58 which applies a CRC procedure to the decoded input data and outputs a decision "OK" or "not OK" based on the CRC result. Additionally, the input data DI is supplied to a threshold function or unit 52 which receives a threshold parameter TH for setting a portion of a hypothetical or theoretical maximum value TM for the decoder metrics, e.g., cumulative path metrics of a Viterbi decoder stage or function.

In the exemplary case that the decoder unit or function 54 is a Viterbi decoder unit, the respective theoretical maximum value TM for the decoder metrics may be determined at the threshold function or unit 52 as the cumulative path metrics of a Viterbi decoder. This cumulative path metric can be calculated for all possible non-zero length candidate block lengths. Furthermore, an actual cumulative path metric PM may be determined at the decoder unit or function 54 based on the received input signal DI and possible candidate block lengths. The obtained actual path metric PM is supplied by the decoder unit or function 54 to a comparison unit or function (e.g. a comparator circuit or the like) 56, where it is compared to a threshold value THxTM supplied by the threshold function or unit 52. The threshold value THxTM may be obtained by multiplying the threshold parameter (which is a value smaller then 1) by the theoretical maximum value TM. The comparison function or unit 40 is configured to compare the actual path metric PM with the threshold value THxTM and to output the comparison result (e.g. THxTM>PM or THxTM<PM) to a decision function or unit 59 which decides whether data is present or not based on the comparison result and the output of the CRC function or unit 58, and output a decision value DP (which may be a binary value reflecting "data present" or "no data present").

In the Viterbi decoder example, the actual path metric PM and the theoretical maximum path metric TM can be obtained as follows:

Let $r=[r[0], \ldots, r[N-1]]\in\mathfrak{R}^N$, where $\mathfrak{R}$ is the set of real numbers, be the input signal DI to the decoder function or unit 54 (e.g. Viterbi algorithm executed by the Viterbi decoder). N is the length of the input vector. The data word, i.e. the output of the Viterbi algorithm, has a length of NR, where R is the code rate. The metric (or path metric) that the Viterbi algorithm uses to make the decision on the most likely codeword is essentially a correlation metric. It can be shown that it is a maximum likelihood (ML) metric in an AWGN (Additive White Gaussian Noise) channel. The cumulative path metric of state zero at the end of the trellis is the numerical value of the correlation between the input signal r and the closest codeword that can be found in the codebook, i.e., the set of all possible code words.

The correlation between a maximum-likelihood (ML) codeword $c=[c[0], \ldots, c[N-1]]\in\{\pm 1\}^N$ and the received signal r is the (cumulative) path metric at state zero at the end of the trellis. The actual path metric PM can thus be obtained as follows:

$$PM = r \cdot c = \sum_{n=0}^{n=N-1} r(n)c(n) = \sum_{n=0}^{n=N-1} \begin{cases} r(n), & \text{if } c(n) = 1 \\ -r(n), & \text{if } c(n) = -1 \end{cases} \quad (1)$$

It can be noticed that the path metric PM is a sum of the elements of the input vector with each sign switched or not, depending on the value (+1 or −1) of the corresponding element in c. From equation (1) it can also be seen, that if r is given, there is a maximum to the path metric, which can be computed without doing the actual Viterbi decoding (i.e. without knowing c). The value of the theoretical maximum path metric is $$TM = \sum_{n=0}^{n=N-1} |r(n)| \quad (2)$$

It is achieved when all of the negative samples get their signs changed but none of the positive samples. For a noiseless and errorless input vector, the actual path metric PM would be equal to the theoretical maximum path metric TM.

The actual path metric PM can be shown to be closer to the theoretical maximum path metric TM, if the ML-estimate c is equal to the transmitted codeword $c_{TX}$ than when it is not equal. And naturally when c differs a little from $c_{TX}$, the actual path metric is closer to TM than when c differs a lot from $c_{TX}$. Also, the more noise r contains, the farther away the actual path metric is from TM. At the extreme, when there is only noise and no data, the actual path metric is expected to be at its farthest from TM (on average).

Figure 3:
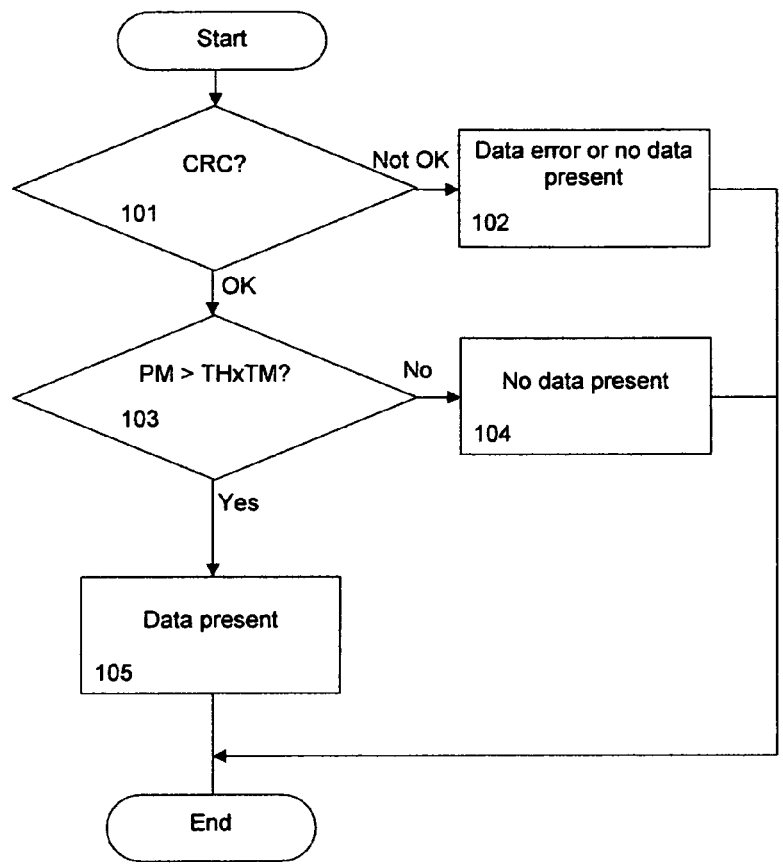
FIG. 3 shows a flow diagram of a data presence detection functionality according to a second embodiment.

FIG. 3 shows a schematic flow diagram of the data presence decision procedure at the decision function or unit 59 according to the first embodiment.

In step 101, the CRC result is checked (i.e. correct CRC has been determined?). If the CRC result is negative (i.e. error detected, "Not OK"), data error or no data present is decided in step 102 and the procedure ends. If the CRC result positive so (no error detected, "OK"), the procedure proceeds to step 103 where the comparison result at the output of the comparison function or unit 56 is checked. If the actual path metric PM is not larger than the threshold value THxTM (predetermined ratio of the theoretical maximum metric), then it is decided in step 104 that no data is present and the procedure ends. However, if the actual path metric PM is larger than the threshold value THxTM, then it is decided in step 105 that data is present and the procedure ends.

Of course, step 103 may be amended to check whether the actual path metric PM is smaller than the threshold value THxTM. Then, the content of blocks 104 and 105 must be exchanged.

Furthermore, there may still be a possibility that some true CRC "OK"'s are not confirmed by the proposed doublecheck. However, this event can be made very rare by setting the threshold parameter TH to a sufficiently low value smaller than 1. Anyway, in the exemplary WB-AMR case, the above event should be very rare because the data has only 3 bits, while the codeword consists of 57 bits.

Figure 4:
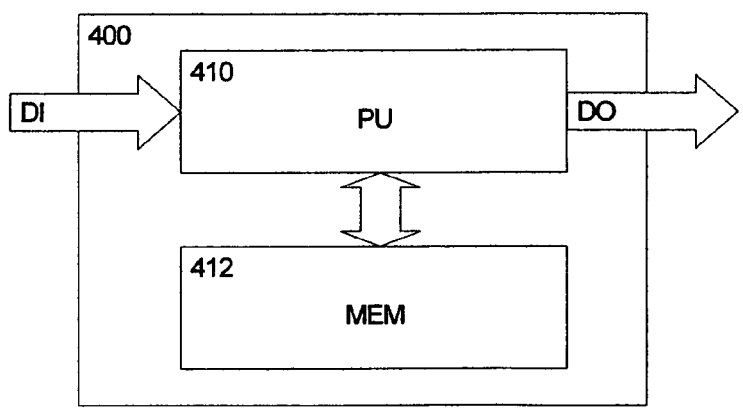
FIG. 4 shows software-based implementation according to the preferred embodiment.

FIG. 4 shows a schematic block diagram of an alternative software-based implementation according to a second embodiment. The required functionalities can be implemented in any network entity 400 (which may be for example an access device, a base station device, a Node B, a terminal device, or a UE) with a processing unit 410, which may be any processor or computer device with a control unit which performs control based on software routines of a control program stored in a memory 412. The control program may also be stored separately on a computer-readable medium. Program code instructions are fetched from the memory 412 and are loaded to the control unit of the processing unit 410 in order to perform the processing steps of the above device-specific functionalities of FIGS. 2 and 3, which may be implemented as the above mentioned software routines. The processing steps may be performed on the basis of input data DI and may generate output data DO. The output data DO may correspond to the decision result DP of the decision function or unit 59.

Consequently, the above functionalities described with reference to FIGS. 2 and 3 may be implemented as a computer program product comprising code means for generating each individual functionality or step of the described procedures for the respective entity when run on a computer device or data processor of the respective entity.

In summary, an apparatus and a method for detecting presence of data have been described, wherein input data is decoded using a decoder metric to obtain decoded data, and an error check is performed for the decoded data. Furthermore, a threshold value is determined based on an obtained maximum value that the decoder metric can assume for the input data, and the threshold value is compared with an actual value of the decoder metric. Presence of the input data is then decided based on results of the error check and the comparison.

It is to be noted that the present invention is not restricted to the above preferred embodiment but can be implemented in connection with any detection of data or data blocks in any kind of data network, where a decoding operation based on a calculation of path metrics and an error check is used. In particular, the invention is not restricted to the downlink direction of a cellular network and can be implemented in any data transmission link. Moreover, the invention is not limited coded system in which Viterbi algorithms are used. The invention can be implemented in connection with other coding schemes using for example simple metrics rather than cumulative path metrics. The preferred embodiment may thus vary within the scope of the attached claims.

The invention claimed is:

1. An apparatus comprising at least one processor and at least one memory including computer program code, the at least one memory and the computer program code configured to, with the at least one processor, cause the apparatus at least to perform:
    decoding input data using a decoder metric to obtain decoded data;
    performing an error check on said decoded data;
    determining a threshold value based on an obtained maximum value that said decoder metric assumes for said input data;
    comparing said threshold value with an actual value of said decoder metric; and
    deciding on a presence of said input data based on results of said error check and said comparison.

2. The apparatus according to claim 1, wherein the apparatus is in an access device.

3. The apparatus according to claim 1, wherein the apparatus is in a terminal device.

4. The apparatus according to claim 1, wherein said decoder metric comprises a Viterbi metric.

5. The apparatus according to claim 1, wherein said error check comprises a cyclic redundancy check.

6. The apparatus according to claim 1, wherein the apparatus is further caused to perform:
determining said threshold value as a predetermined portion of said obtained maximum value.

7. The apparatus according to claim 1, wherein the apparatus is further caused to perform:
using a setting input for setting said predetermined portion.

8. The apparatus according to claim 1, wherein the apparatus is further caused to perform:
obtaining said maximum value by calculating a sum of all elements of an input vector without applying said decoder metric.

9. The apparatus according to claim 1, wherein deciding on the presence of said input data based on results of said error check and said comparison comprises deciding on the presence of said input data if said comparison result indicates that said actual value of said decoder metric is greater than said threshold value and if said error check indicates that said input data was correctly decoded.

10. A method comprising:
decoding input data using a decoder metric to obtain decoded data;
performing an error check on said decoded data;
determining a threshold value based on an obtained maximum value that said decoder metric assumes for said input data;
comparing said threshold value with an actual value of said decoder metric; and
deciding on a presence of said input data based on results of said error check and said comparison.

11. The method according to claim 10, wherein said decoder metric comprises a Viterbi metric.

12. The method according to claim 10, wherein said error check comprises a cyclic redundancy check.

13. The method according to claim 10, further comprising determining said threshold value as a predetermined portion of said obtained maximum value.

14. The method according to claim 13, further comprising using a setting input for setting said predetermined portion.

15. The method according to claim 10, further comprising obtaining said maximum value by calculating a sum of all elements of an input vector without applying said decoder metric.

16. The method according to claim 10, wherein deciding on the presence of said input data based on results of said error check and said comparison comprises deciding on the presence of said input data if said comparison result indicates that said actual value of said decoder metric is greater than said threshold value and if said error check indicates that said input data was correctly decoded.

17. A computer program product comprising a non transitory computer-readable medium bearing computer program code embodied therein for use with a computer, the computer program code comprising:
code for decoding input data using a decoder metric to obtain decoded data;
code for performing an error check on said decoded data;
code for determining a threshold value based on an obtained maximum value that said decoder metric assumes for said input data;
code for comparing said threshold value with an actual value of said decoder metric; and
code for deciding on a presence of said input data based on results of said error check and said comparison.

18. The computer program product according to claim 17, wherein said decoder metric comprises a Viterbi metric.

19. The computer program product according to claim 17, wherein said error check comprises a cyclic redundancy check.

20. The computer program product according to claim 17, wherein code for deciding on the presence of said input data based on results of said error check and said comparison comprises code for deciding on the presence of said input data if said comparison result indicates that said actual value of said decoder metric is greater than said threshold value and if said error check indicates that said input data was correctly decoded.

* * * * *